(12) United States Patent
Liu

(10) Patent No.: US 7,043,742 B1
(45) Date of Patent: *May 9, 2006

(54) PROTECTIVE COVER FOR A DATA STORAGE DISC AND METHOD OF USE

(76) Inventor: Julian Liu, 55 Birchwood Crescent, Port Moody, BC (CA) V3H 5H7

( * ) Notice: Subject to any disclaimer, the term of this patent is extended or adjusted under 35 U.S.C. 154(b) by 0 days.

This patent is subject to a terminal disclaimer.

(21) Appl. No.: 11/099,297

(22) Filed: Apr. 5, 2005

Related U.S. Application Data

(62) Division of application No. 10/330,316, filed on Dec. 27, 2002, now Pat. No. 6,901,608.

(51) Int. Cl.
*G11B 23/03* (2006.01)

(52) U.S. Cl. .................... 720/719; 369/291.1

(58) Field of Classification Search ............ 369/291.1, 369/281, 289.1, 272.1, 291, 289, 282, 272, 369/292; 206/310; 720/719, 718, 720; 360/135, 360/137; 428/66.6
See application file for complete search history.

(56) References Cited

U.S. PATENT DOCUMENTS

| | | | |
|---|---|---|---|
| 5,857,575 A * | 1/1999 | Watson et al. ................. 211/40 |
| 6,568,526 B1 * | 5/2003 | Reinhardt et al. ........... 206/310 |
| 6,574,188 B1 * | 6/2003 | Fliegel ........................ 720/707 |

* cited by examiner

*Primary Examiner*—Julie Anne Watko
(74) *Attorney, Agent, or Firm*—Ted Masters

(57) ABSTRACT

A protective cover for a data storage disc such as a compact disc (CD) includes a disc which has a central retainer for engaging the hole in the data storage disc. The protective cover may placed on both the data storage side and the opposite side of the data storage disc. In one embodiment the retainer consists of a plurality of upstanding members disposed on one side of the protective cover, and a corresponding plurality of cavities disposed on the other side of the protective cover. The cavities of one protective cover receive the upstanding members of another protective cover so that a plurality of protective covers may be stacked.

6 Claims, 8 Drawing Sheets

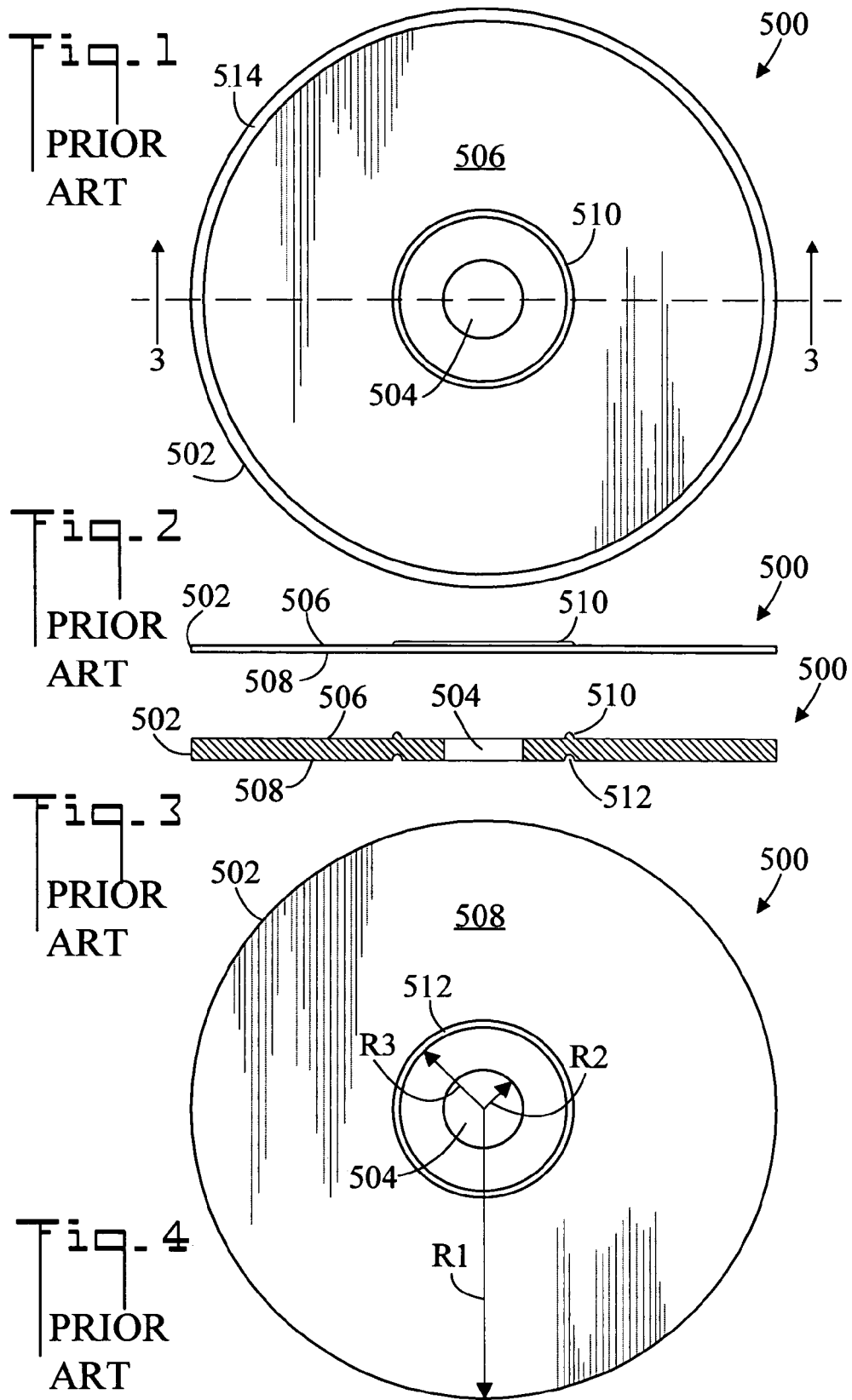

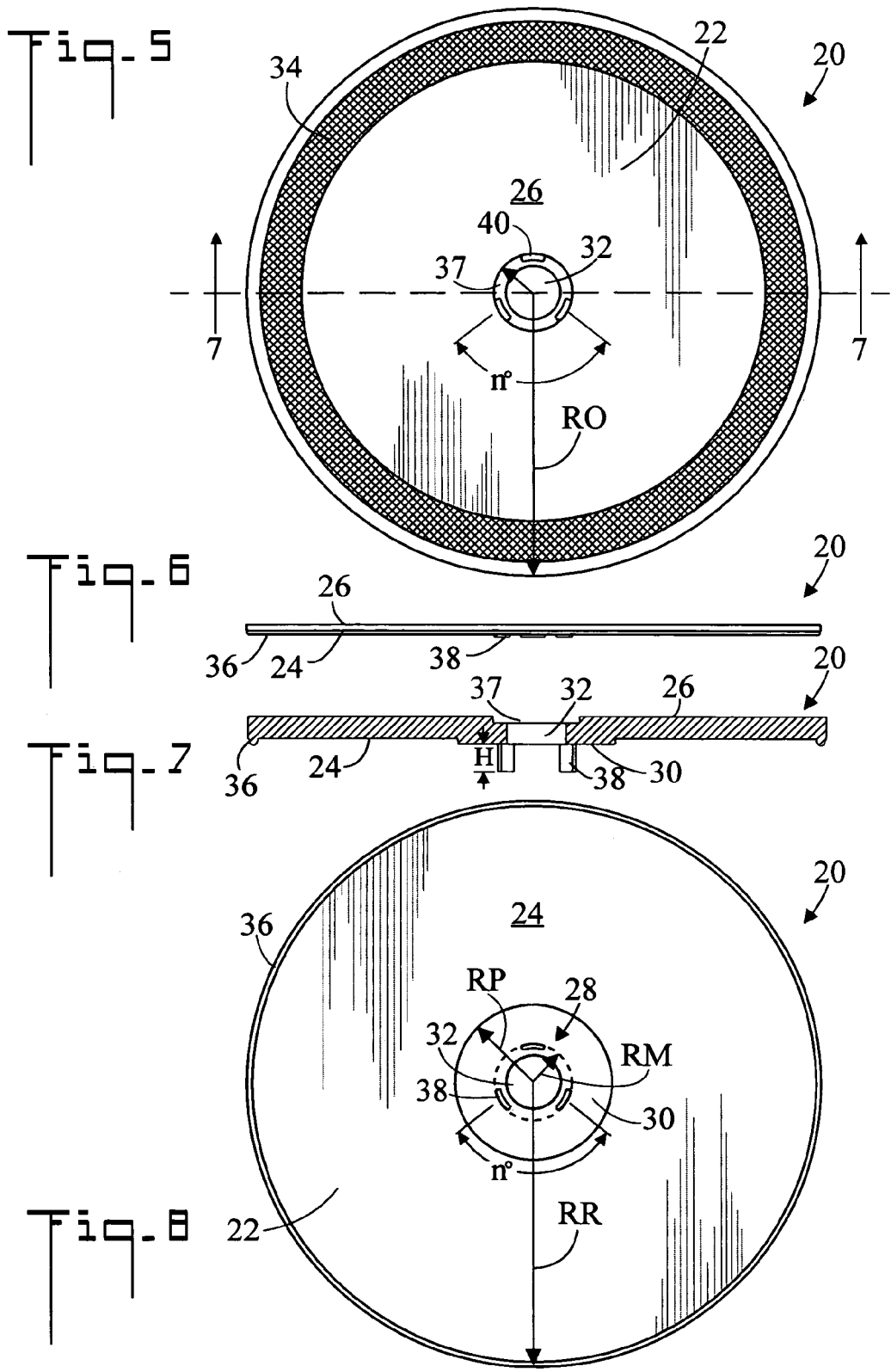

PROTECTIVE COVER FOR A DATA STORAGE DISC AND METHOD OF USE

CROSS REFERENCE TO RELATED APPLICATION

This application is a division of U.S. application Ser. No. 10/330,316, filed Dec. 27, 2002 now U.S. Pat. No. 6,901,608.

TECHNICAL FIELD

The present invention generally pertains to data storage discs such as compact discs (CDs), and more particularly to a protective cover and method for the protecting the discs from damage.

BACKGROUND OF THE INVENTION

Devices for protecting data storage discs from damage such as scratches are well known in the art. One such device is the "jewel case" which usually comprises a clear plastic case in which the data storage disc is placed. Carrying pouches are also available for holding a data storage disc. Both of these devices are bulky. Other devices exist which are placed against the data storage side of the data storage disc. For example, U.S. Pat. No. 6,123,191 shows a compact disk holder in the shape of a flat disk made from a resilient material and including a central resilient hub and a felt backing for cushioning the compact disk. One side of the invention holder has an adhesive coating protected by a non-adhesive, peelable cover. Upon removal of the peelable cover, the holder may then be adhesively attached to a vehicle visor, wall, window, or any other desired surface location. The compact disk is then pressed onto the holder where it is fixedly held and accessible without fear of damage when removed.

U.S. Pat. No. 5,757,765 illustrates a protection structure adapted for protecting a disc includes a film mounted on an underside of the disc for covering a data reading region of the disc. The film includes an inner rim portion abutting on an inner annular portion of the disc, and an outer rim portion abutting on an outer annular portion of the disc. A plurality of ribs each a extend radially and inwardly from the inner rim portion of the film and each abut on the inner annular portion of the disc, and a plurality of recesses are each defined between adjacent two of the ribs. An annular adhesive sheet forms an adhesive surface which can be adhered on each of the ribs and can be adhered on the inner annular portion of the disc via each of the recesses, thereby securing each of the ribs on the inner annular portion of the disc.

U.S. Pat. No. 5,299,186 discloses a disc protecting cover for preventing a disc used as an information recording medium from being damaged or wounded while the disc is not in use. The cover comprises a flat portion (11;11A) having a diameter smaller than that of a disc which is provided with a center hole and a signal reading surface portion formed on a part of the surface thereof extending around the center hole, and an engaging portion (12) projecting from a central part of the flat portion (11'11A) and adapted to be inserted into the center hole of the disc to engage with the same. The flat portion (11;11A) covers the signal reading surface portion of the disc when the engaging portion (12) is inserted into the center hole of the disc to engage with the same. The disc protecting cover is attached to the disc to be detachable therefrom and can reliably protect the signal reading surface portion of the disc against damage or wound without covering portions of the disc which are not required to be covered therewith.

U.S. Pat. No. 4,879,710 consists of a semi-permanent disc protector for shielding an optical disc against surface scratches. The disc protector comprises a transparent annular sheet of a cellulose triacetate film having an inner ring of adhesive adjacent to the center hole of the protector and an outer ring of adhesive adjacent to the outer circumference of the protector. The protector may be applied to either side of an optical disc. When applied to the data-read side of a disc, the rings of adhesive are so disposed that they do not obscure the data region of the disc. The disc protector is applied to the disc with the aid of a centering adapter that insures concentricity of the disc and protector.

U.S. Pat. No. 4,736,840 describes a protective holder for use with a compact disc or like object. The holder comprises relatively thin, substantially rigid upper and lower plates having diameters slightly larger than the diameter of the compact disc. The lower plate has a center hole having a diameter substantially equal to the diameter of the center hole of the compact disc. The upper plate has an elongated finger slot extending radially outwardly for a distance substantially equal to one-fourth the radius of the upper plate. A annular felt pad is affixed to an upper surface of the lower plate to cushion the information bearing lower surface of the compact disc when the compact disc is in place in the holder. A semi-circumferential peripheral wall extends between and is affixed to the upper and lower plates. The peripheral wall is dimensioned to suitably space said upper and lower plates to snugly receive and frictionally retain the disk therebetween. The peripheral wall is preferably formed from an upper lip extending downwardly from the upper plate and a lower lip extending upwardly from the lower plate, said upper and lower lips being affixed along their lengths to form the peripheral wall.

SUMMARY OF THE INVENTION

The present invention is directed to a protective cover for a data storage disc, such as a compact disc (CD). The protective cover is used to guard the recorded side of the CD from being scratched, and can also be used to protect the non-recorded side. Additionally, the protective cover protects the edge of the CD so that warping cannot occur if the CD is inadvertently dropped. The present invention is reusable, easily transportable and inexpensive to make. It also allows for easy stacking of compact discs, saves space and is much faster to access. The protective cover is useful in mailing or otherwise transporting a CD. The protective cover is preferably fabricated from a clear polymer through which a user can view the CD.

In accordance with a preferred embodiment of the invention, a protective cover for a data storage disc having (1) an edge having a first radius, (2) a central hole having a second radius, (3) a data storage side, and (4) an opposite side from the data storage side, includes:

a disc having an inside surface which contacts the data storage disc, and an opposite outside surface;

a retainer centrally connected to the inside surface, the retainer is shaped and dimensioned to engage the central hole in the data storage disc;

the retainer includes a plurality of upstanding members, the plurality of upstanding members being spaced n° apart;

the plurality of upstanding members defining a radius which is slightly greater than the second radius of the central hole in the data storage disc, so that when the plurality of upstanding members are placed in the central hole of the data storage disc, the plurality of upstanding members grip the central hole and hold the protective cover in contact with the data storage disc;

a corresponding plurality of cavities are disposed in the outside surface, the cavities also being spaced n° apart;

the plurality of cavities are rotated about the center of the protective cover with respect to the plurality of upstanding members; and, wherein the cavities of a first protective cover may receive the upstanding members of a second protective cover, thereby enabling the two covers to lie flatly against one another.

In accordance with another aspect of the invention, each of the plurality of upstanding members has an end having a notch and tab, so that a first protective cover may be placed in contact with the data storage side of the data storage disc, and a second protective cover placed in contact with the opposite side of the data storage disc, wherein the second protective cover may rotated with respect to said first protective cover so that the tab of the second protective cover enters the notch of the first protective cover and the tab of the first protective cover enters the notch of the second protective cover, thereby locking the first and second protective covers together.

In accordance with another aspect of the invention, the disc has an outer radius which is slightly larger than the first radius of the edge of the data storage disc, so that the protective cover will protect the edge of the data storage device.

In accordance with another aspect of the invention, the outside surface of the disc has a rough area, so that when the outside surface is laid upon a smooth surface, the rough area will prevent a vacuum from being formed between the protective cover and the smooth surface, thereby improving handling of the protective cover.

In accordance with another aspect of the invention, a hole is centrally disposed in the protective cover, so that a plurality of protective covers may be stacked upon a post.

In accordance with another aspect of the invention, each of the plurality of upstanding members has a height such that when the plurality of upstanding members engage the central hole of the data storage disc, the plurality of upstanding members protrude from the opposite side of the data storage disc. A recessed area is centrally disposed on the outside surface, so that when a first protective cover is installed on a data storage disc, and the opposite side of the data storage disc is placed in contact with the outside surface of a second protective cover, the recessed area of the second protective cover receives the plurality of protruding upstanding members of the first protective cover, so that the data storage disc lies flatly on the second protective cover.

In accordance with another aspect of the invention, a raised ring is disposed on the outside surface, the raised ring is shaped and dimensioned to be received by the circular groove on the opposite side of the data storage disc, so that the outside surface of the protective cover may be placed in contact with the opposite side of the data storage disc wherein the raised ring is received by the circular groove.

In accordance with another aspect of the invention, a circular plateau is disposed on the inside surface, the circular plateau has a radius which is slightly less than the inner third radius of the raised ring of the data storage disc, so that when the inside surface of the protective cover comes into contact with the data storage side of the data storage disc, the circular plateau fits within the raised ring.

In accordance with another aspect of the invention, the retainer includes a resilient ring which grips the central hole of the data storage disc.

Other aspects of the present invention will become apparent from the following detailed description, taken in conjunction with the accompanying drawings, which illustrate, by way of example, the principles of the invention.

BRIEF DESCRIPTION OF THE DRAWINGS

FIG. 1 is a top plan view of a prior art data storage disc showing the data storage side of the disc;

FIG. 2 is a side elevation view of the data storage disc;

FIG. 3 is an expanded cross section view along the line 3—3 of FIG. 1;

FIG. 4 is a bottom plan view of the prior art data storage disc showing the opposite side from the data storage side;

FIG. 5 is a top plan view of a protective cover for the data storage disc in accordance with the present invention;

FIG. 6 is a side elevation view of the protective cover;

FIG. 7 is an expanded cross sectional view along the line 7—7 of FIG. 5;

FIG. 8 is a bottom plan view of the protective cover;

DETAILED DESCRIPTION OF THE INVENTION

Figure 9:
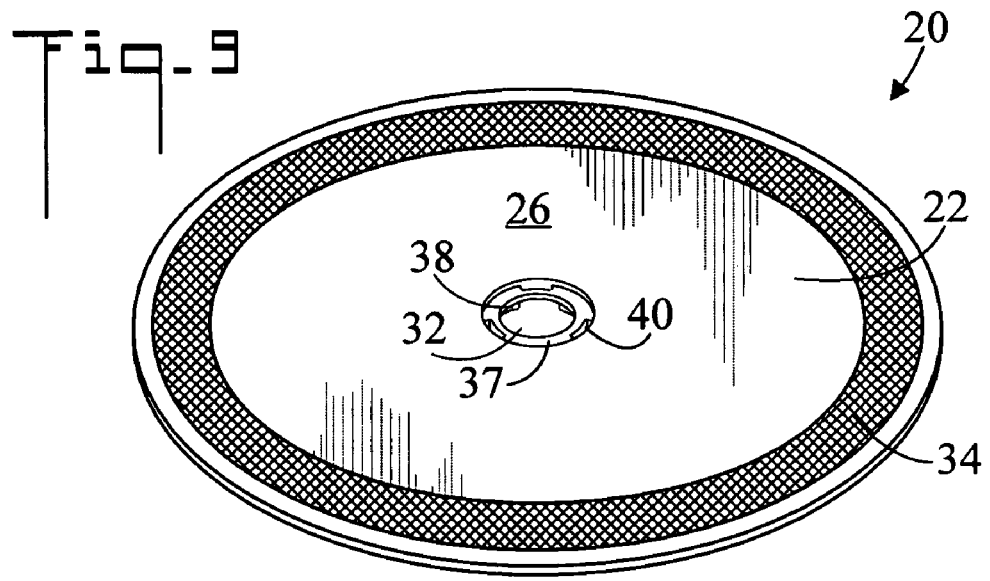
FIG. 9 is a perspective view of the protective cover showing an outside surface and associated elements.

Referring initially to FIGS. 1–4, there are illustrated top plan, side elevation, expanded cross sectional, and bottom plan views respectively of a prior art data storage disc 500, such as a compact disc (CD), digital video disc (DVD), and the like. Data storage disc 500 has (1) an edge 502 having a first radius R1, (2) a central hole 504 having a second radius R2, (3) a data storage side 506, (4) an opposite side from the data storage side 508, (5) a raised ring 510 disposed between first radius R1 and second radius R2, raised ring 510 is disposed on data storage side 506 and has an inner third radius R3, and (6) a circular groove disposed 512 on the opposite side 508 between first radius R1 and second radius R2. Data storage disc 500 has an outer non-recording band 514 upon which no data is stored. It is noted that for clarity FIG. 3 is expanded in thickness to better show the features of data storage disc 500. The expanded view technique is also used in FIGS. 7, 13, 16, 18, 20, 23, and 24.

Now referring to FIGS. 5–8, there are illustrated top plan, side elevation, expanded cross sectional, and bottom plan views respectively of a protective cover for a data storage disc 500 in accordance with the present invention, generally designated as 20. Protective cover 20 includes a disc 22 having an inside surface 24 which contacts data storage disc 500, and an opposite outside surface 26. A retainer 28 is centrally connected to inside surface 24. Retainer 28 is shaped and dimensioned to be snuggly received by central hole 504 in data storage disc 500. A circular plateau 30 is disposed on inside surface 24, circular plateau 30 having a radius RP which is slightly less than the inner third radius R3 of raised ring 510 of data storage disc 500, so that when inside surface 24 of protective cover 20 comes into contact with data storage side 506 of data storage disc 500, circular plateau 30 fits within raised ring 510. Circular plateau 30 thereby assists in keeping protective cover 20 centered on data storage disc 500 (refer also to FIG. 13).

Disc 22 has an outer radius RO which is slightly larger than first radius R1 of edge 502 of data storage disc 500, so that protective cover 20 will protect the edge of data storage device 500.

Figure 17:
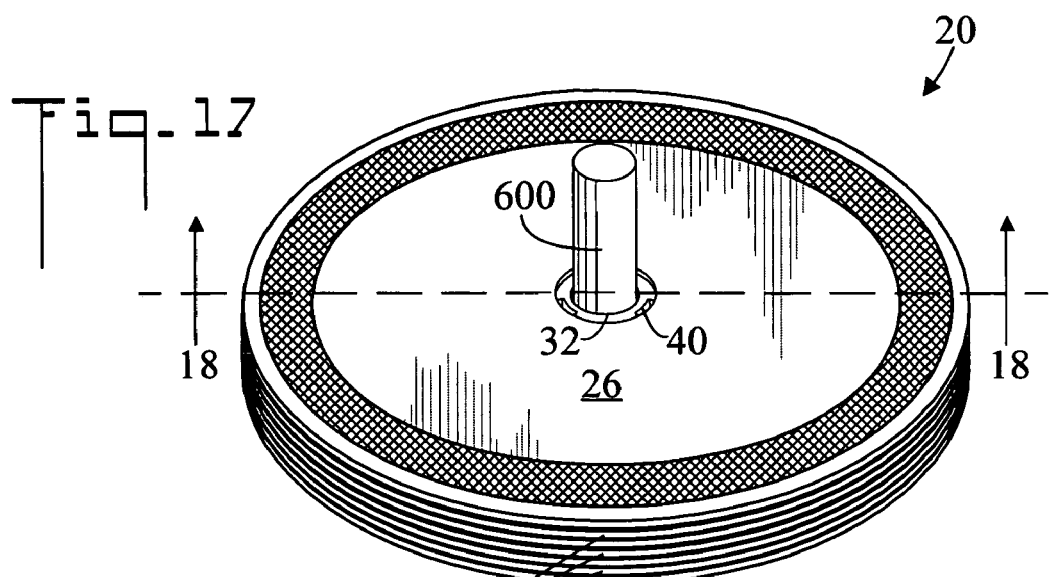
FIG. 17 is perspective view of a plurality of stacked protective covers.

A hole 32 is centrally disposed in disc 22, so that a plurality of protective covers 20 may be stacked upon a post 600 (refer also to FIG. 17).

Outside surface 26 of disc 22 has a rough area 34 (cross hatched), so that when outside surface 26 is laid upon a smooth surface such as a glass table, rough area 34 will prevent a vacuum from being formed between protective cover 20 and the smooth surface, thereby improving the handling of protective cover 20 by making it easier to pick up.

An outer ring 36 is disposed on inside surface 24. Outer ring 36 has a radius RR so that when protective cover 20 contacts data storage side 506 of data storage disc 500, outer ring 36 contacts outer non-recording band 514 of data storage disc 500 (refer also to FIG. 13).

A recessed area 37 is centrally disposed on outside surface 26.

In an embodiment of the invention, retainer 28 includes a plurality of upstanding members 38 disposed on inside surface 24, the members being spaced n° apart. In the shown embodiment, there are three upstanding members 38 which are spaced 120° apart. Four upstanding members spaced 90° apart could also be employed. The plurality of upstanding members 38 define a radius RM which is slightly greater than second radius R2 of central hole 504 in data storage disc 500. Upstanding members 38 are slightly resilient, so that when the plurality of upstanding members 38 are placed in central hole 504 of data storage disc 500, plurality of upstanding members 38 grip central hole 504. Upstanding members 38 have a height H.

In another embodiment of the invention, a corresponding plurality of cavities 40 are disposed in outside surface 26 (three cavities 40 to correspond with the three upstanding members 38). Cavities 40 are also spaced n° apart. Cavities 40 are shaped and dimensioned to receive upstanding members 38. Plurality of cavities 40 are rotated with respect to plurality of upstanding members 38. In the shown embodiment cavities 40 are rotated n/2° (or 60°) with respect to upstanding members 38. The cavities 40 cooperate with the upstanding members 38, so that a plurality of protective covers 20 may be stacked. Cavities 40 of a first protective cover 20 may receive upstanding members 38 of a second protective cover 20, thereby enabling the two covers to lie flatly against one another (refer to FIGS. 17 and 18).

FIG. 9 is a perspective view of protective cover 20 showing outside surface 26 and associated elements.

Figure 10:
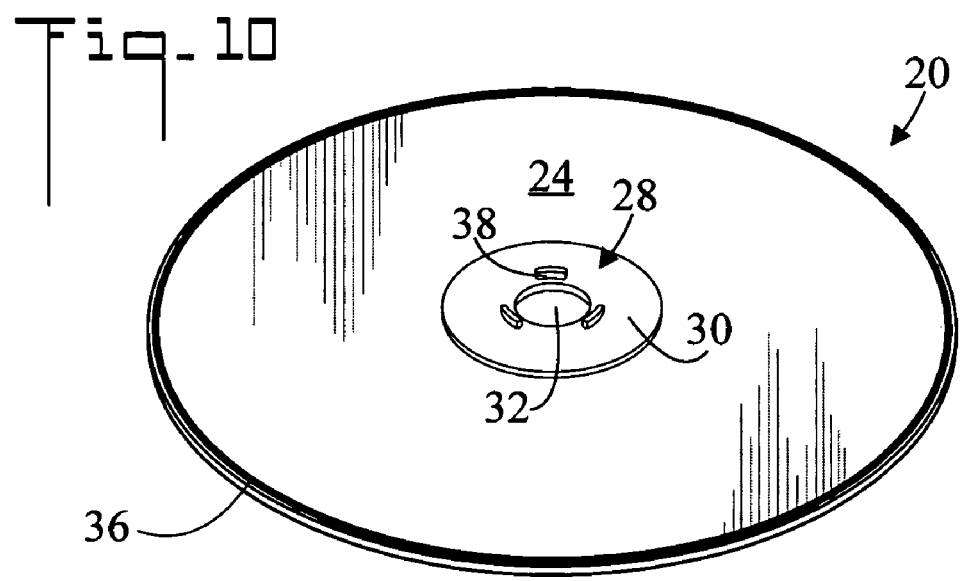
FIG. 10 is a perspective view of protective cover showing an inside surface and associated elements.

FIG. 10 is a perspective view of protective cover 20 showing inside surface 24 and associated elements.

Figure 11:
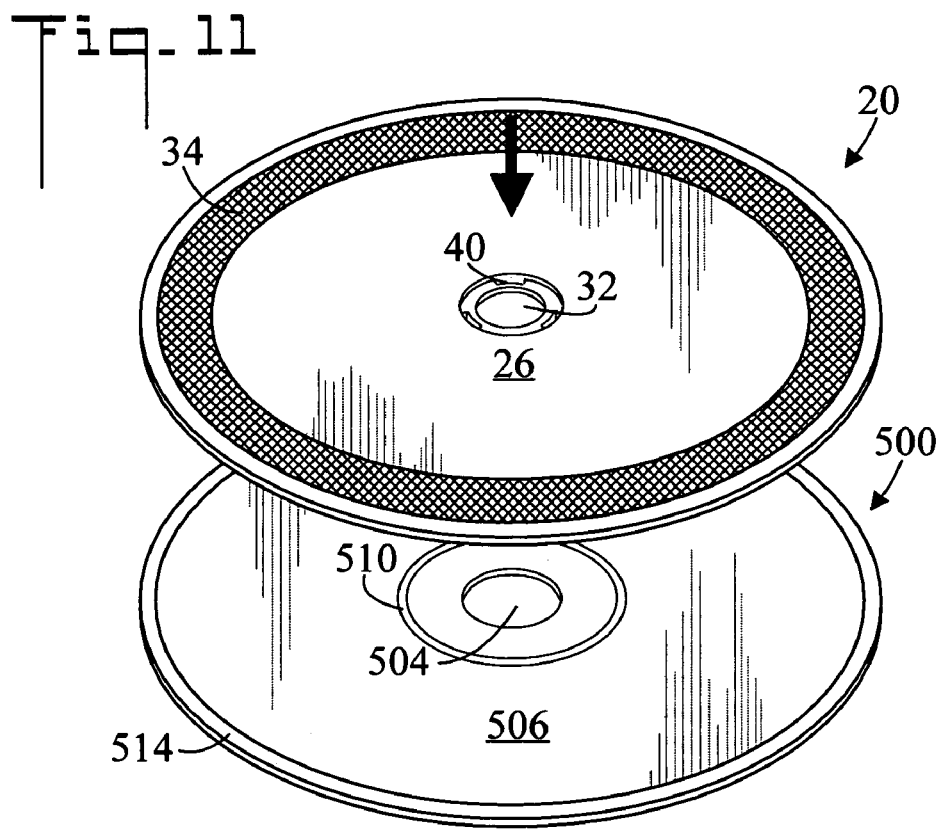
FIG. 11 is a perspective view of the protective cover being installed on a data storage disc.

FIG. 11 is a perspective view of protective cover 20 being installed on a data storage disc 500.

Figure 12:
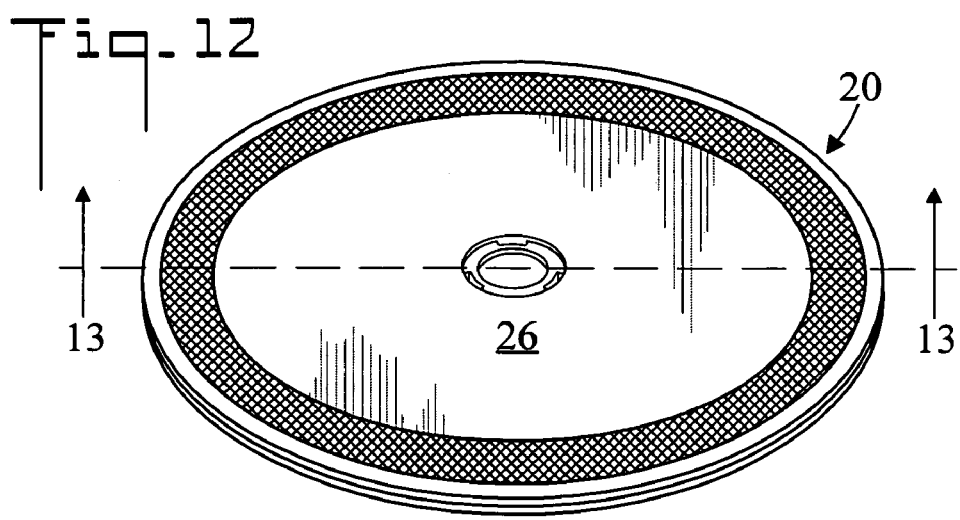
FIG. 12 is a perspective view of the protective cover installed on the data storage disc.

FIG. 12 is a perspective view of protective cover 20 installed on data storage disc 500.

Figure 13:
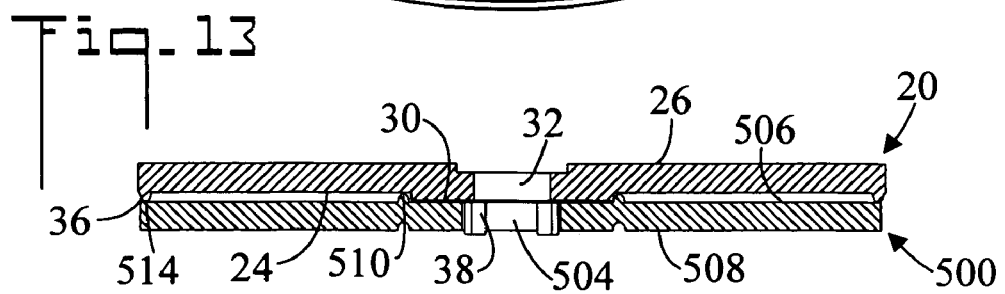
FIG. 13 is an expanded cross sectional view along the line 13—13 of FIG. 12.

FIG. 13 is an expanded cross sectional view along the line 13—13 of FIG. 12. Outer ring 36 contacts non-recording band 514, and circular plateau 30 is received by raised ring 510. Each of the plurality of upstanding members 38 have a height H such that when the plurality of upstanding members 38 engage central hole 504 of the data storage disc 500, the plurality of upstanding members 38 protrude slightly from opposite side 508 of data storage disc 500.

Figure 14:
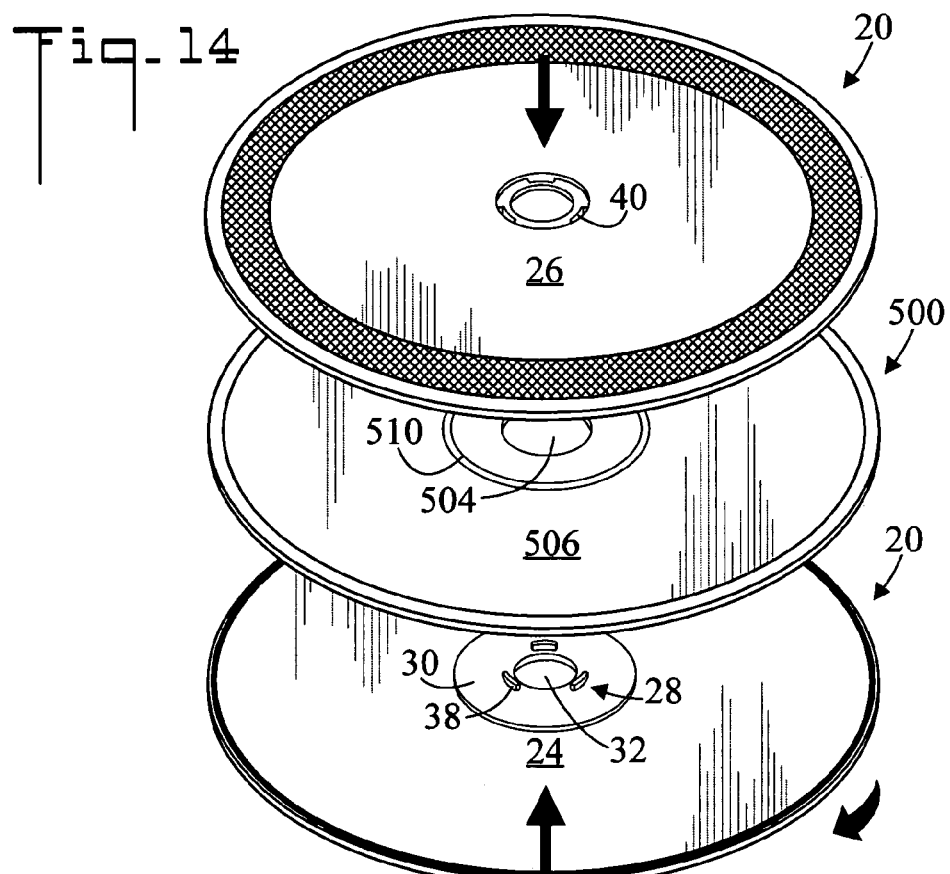
FIG. 14 is a perspective view of two protective covers being installed on opposite sides of the data storage disc.

FIG. 14 is a perspective view of two protective covers 20 being installed on opposite sides of data storage disc 500. In this embodiment of the invention, both the data storage side 506 and the opposite side 508 of the data storage disc are protected. A first protective cover 20 is installed on data storage side 506 of data storage disc 500, wherein retainer 28 engages central hole 504 in data storage disc 500. A second protective cover 20 is installed on opposite side 508 of data storage disc 500, wherein retainer 28 engages central hole 504 in data storage disc 500. For the retainer 28 embodiment shown, in order to effect the installation the second protective cover 20 is rotated as shown with respect to the first protective cover, so that the upstanding members 38 of the first protective cover 20 will not interfere with the upstanding members 38 of the second protective cover 20.

Figure 15:
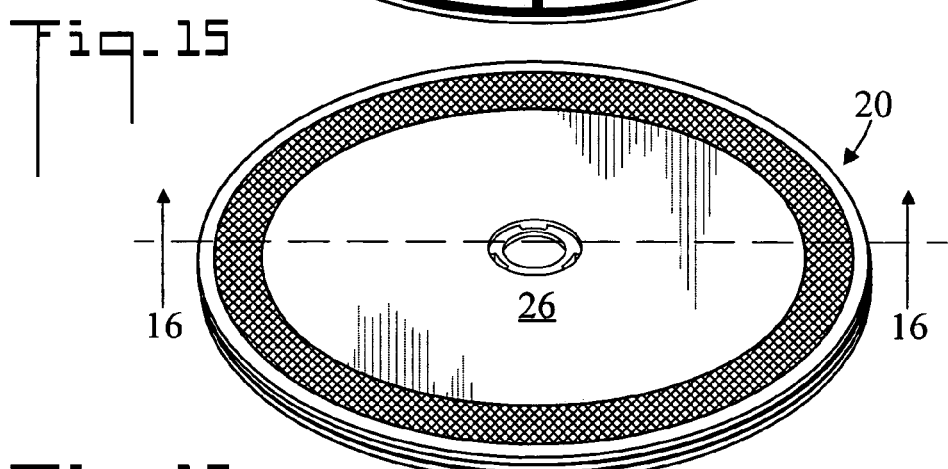
FIG. 15 is a perspective view of the two protective covers installed on opposite sides of the data storage disc.

FIG. 15 is a perspective view of the two protective covers 20 installed on opposite sides of data storage disc 500.

Figure 16:
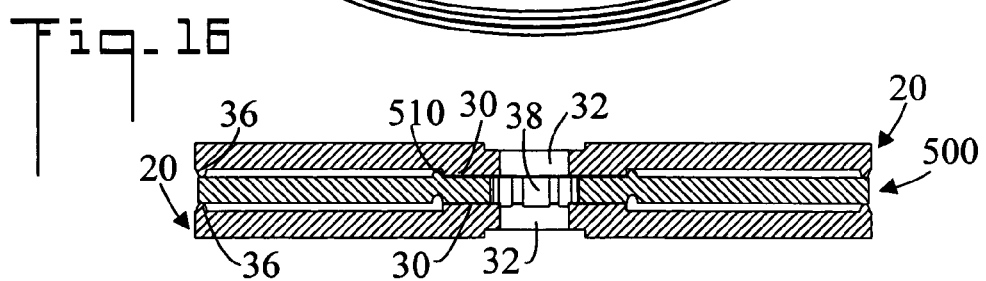
FIG. 16 is an expanded cross sectional view along the line 16—16 of FIG. 15.

FIG. 16 is an expanded cross sectional view along the line 16—16 of FIG. 15.

Figure 18:
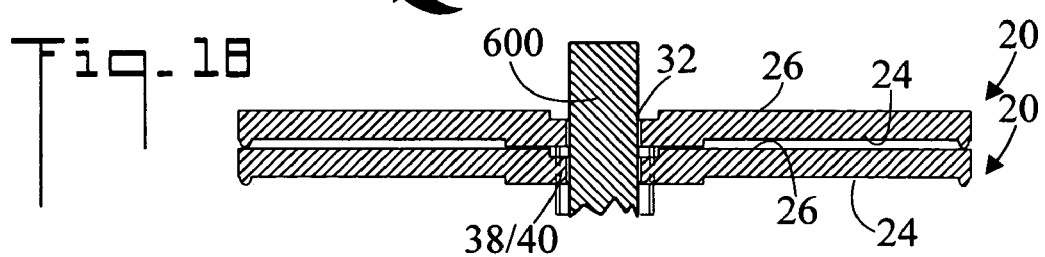
FIG. 18 is an expanded cross sectional view along the line 18—18 of FIG. 17.

FIG. 17 is perspective view of a plurality of stacked protective covers 20, and FIG. 18 is an expanded cross sectional view along the line 18—18 of FIG. 17. In the shown embodiment the protective covers 20 are stacked on a post 600. Hole 32 is shaped and dimensioned to receive post 600. The inside surface 24 of a first protective cover 20 is placed in contact with the outside surface 26 of a second protective cover 20, so that the upstanding members 38 of the first protective cover 20 are received by the cavities 40 of the second protective cover 20, so that the two protective covers 20 lie flatly against one another. In order to effect the stacking, the upstanding members 38 of the first protective cover 20 must be aligned with the cavities 40 of the second protective cover 20.

Figure 19:
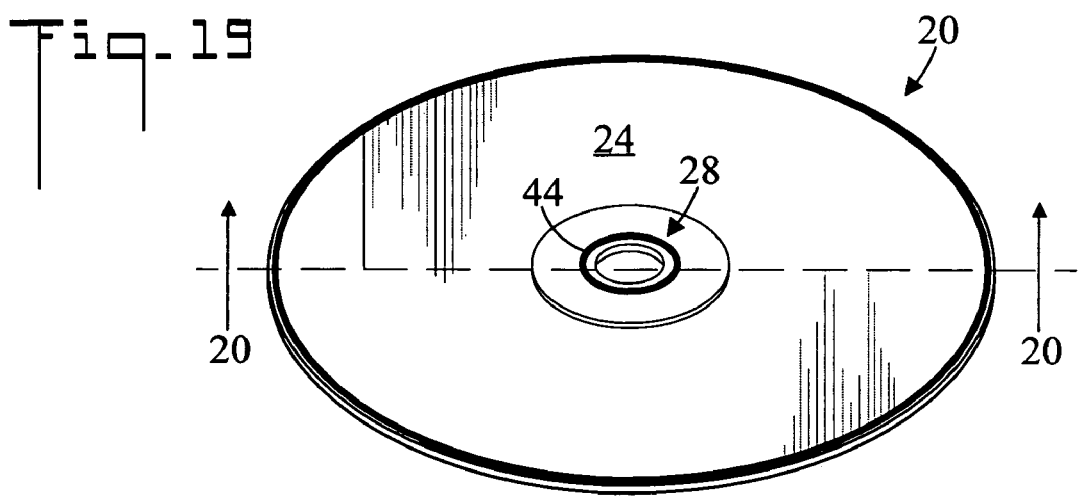
FIG. 19 is a perspective view of a second embodiment of a retainer.
Figure 20:
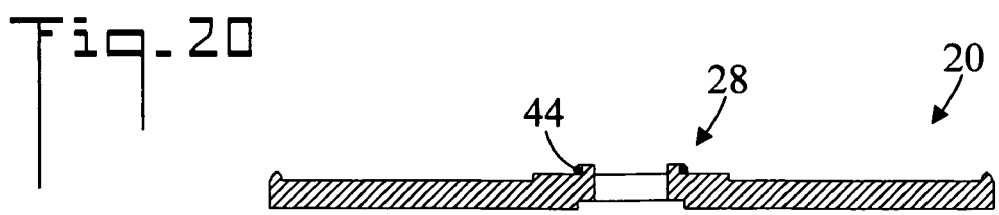
FIG. 20 is an expanded cross sectional view along the line 20—20 of FIG. 19

FIG. 19 is a perspective view of a second embodiment of retainer 28, and FIG. 20 is an expanded cross sectional view along the line 20—20 of FIG. 19. In this embodiment, retainer 28 includes a resilient ring 44, such as a rubber O-ring having a radius slightly larger than central hole 504, which when compressed grips central hole 504 of data storage disc 500.

Figure 21:
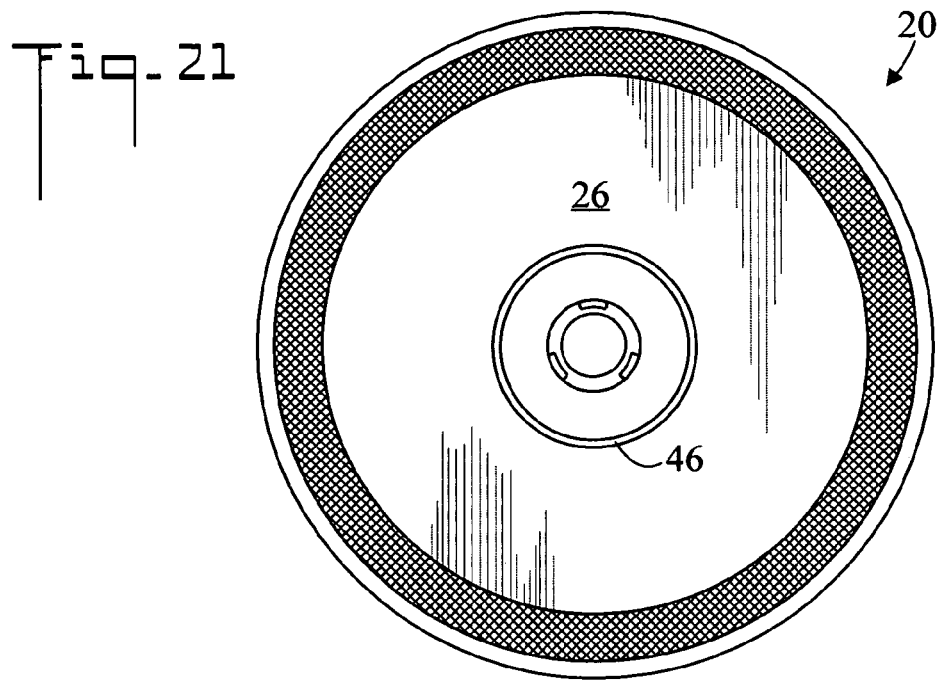
FIG. 21 is a top plan view showing a raised ring feature of the protective cover.

FIG. 21 is a top plan view showing an additional feature of protective cover 20. In this embodiment, a raised ring 46 is disposed on outside surface 26. Raised ring 46 is shaped and dimensioned to be received by the circular groove 512 on the opposite side 508 of data storage disc 500. Because of raised ring 46, outside surface 26 of protective cover 20 may be placed in contact with opposite side 508 of the data storage disc 500 wherein raised ring 46 is received by circular groove 512. This feature can be used to lock the data storage disc 500 and the protective cover 20 together to prevent lateral slipping. It is further noted that raise ring 46 will serve to break vacuum when protective cover 20 is placed on a smooth surface such as a glass top table. This makes for better handling of protective cover 20.

Figure 22:
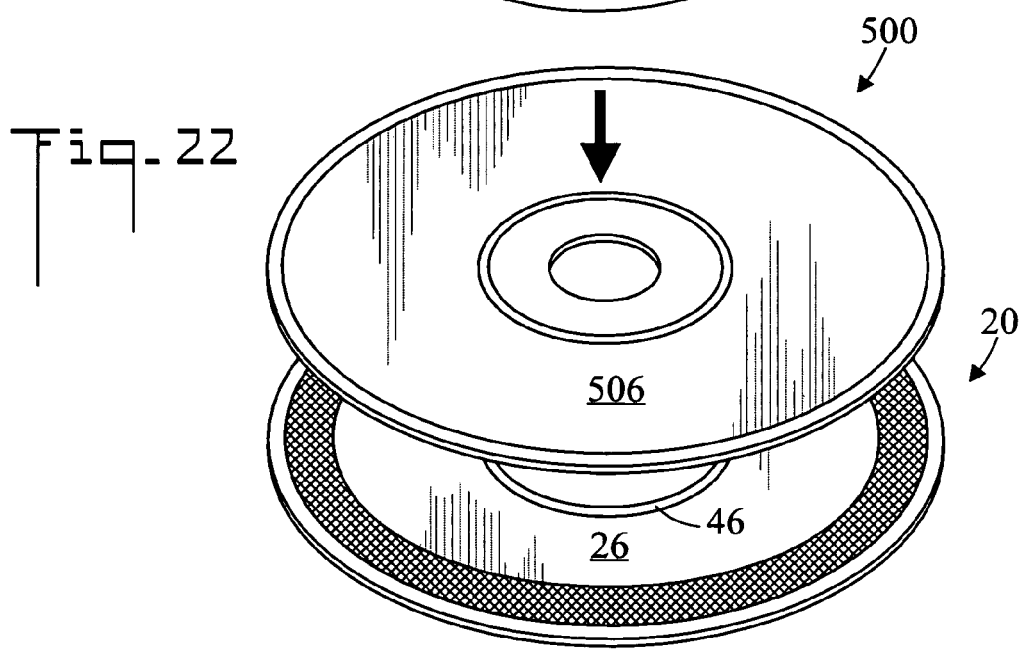
FIG. 22 is a perspective view of a data storage disc being placed adjacent to a protective cover.

FIG. 22 is a perspective view of a data storage disc 500 being placed adjacent to a protective cover 20, so that raised ring 46 is received by circular groove 512.

Figure 23:
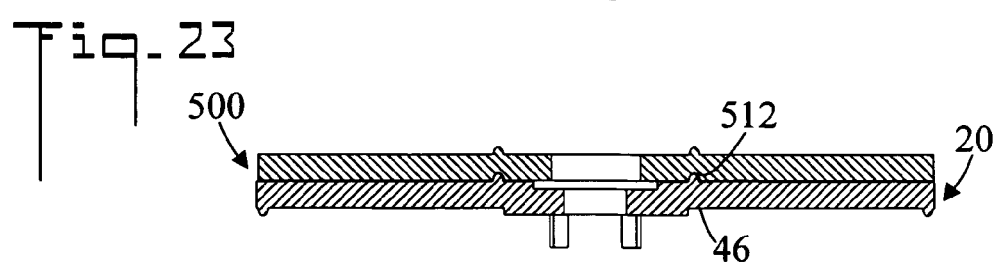
FIG. 23 is an expanded cross sectional view of a data storage disc placed on top of a protective cover.

FIG. 23 is an expanded cross sectional view of a data storage disc 500 placed on top of a protective cover 20 wherein raised ring 46 is received by circular groove 512.

Figure 24:
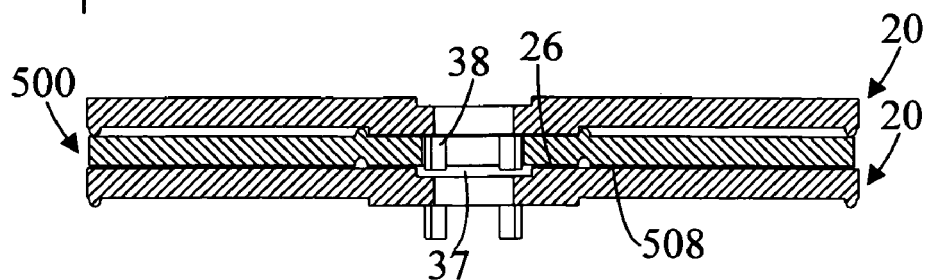
FIG. 24 is an expanded cross sectional view of a first protective cover installed upon a data storage disc, and the combination placed upon a second protective cover.

FIG. 24 is an expanded cross sectional view of a first protective cover 20 installed upon a data storage disc 500, and the combination placed upon a second protective cover 20. Outside surface 26 of protective cover 20 has a centrally disposed recessed area 37 (also refer to FIGS. 5 and 7). When first protective cover 20 is installed on data storage disc 500, and the opposite side 508 of the data storage disc 500 is placed in contact with the outside surface 26 of a second protective cover 20, recessed area 37 receives the plurality of protruding upstanding members 38 of the first protective cover 20, so that data storage disc 500 lies flatly on the second protective cover 20.

Figure 25:
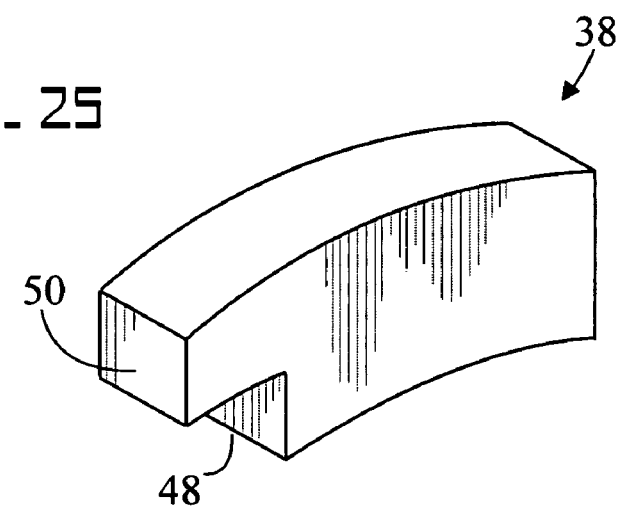
FIG. 25 is an enlarged perspective view of an alternative upstanding member design; and, FIG. 26 is an enlarged perspective view of another alternative upstanding member design.

FIG. 25 is an enlarged perspective view of an alternative upstanding member 38 design. Each of the plurality of upstanding members 38 (refer to FIG. 10), have an end having a notch 48 and a tab 50. Referring also to FIGS. 14–16, a first protective cover 20 may be placed in contact with the data storage side 506 of the data storage disc 500, and a second protective cover 20 placed in contact with the opposite side 508 of the data storage disc 500, wherein the second protective cover 20 may rotated with respect to the first protective cover 20 so that tab 50 of the second protective cover 20 enters the notch 48 of the first protective cover 20, and tab 50 of the first protective cover 20 enters the notch 48 of the second protective cover 20, thereby locking the first and second protective covers 20 together.

In terms of use, a method for protecting a data storage disc 500, includes:
(a) providing first and second data storage discs 500, each data storage disc 500 including:
   an edge 502 having a first radius R1,
   a central hole 504 having a second radius R2;
   a data storage side 506;
   an opposite side 508 from data storage side 506;
(b) providing first and second protective covers 20, each protective cover 20 including:
   a disc 22 having an inside surface 24 and an opposite outside surface 26;
   a retainer 28 centrally connected to inside surface 24, retainer 28 shaped and dimensioned to be snuggly received by central hole 504 in data storage disc 500;
   retainer 28 including a plurality of upstanding members 38, the plurality of upstanding members 38 being spaced n° apart;
   the plurality of upstanding members 38 defining a radius RM which is slightly greater than second radius R2 of central hole 504 in data storage disc 500, so that when the plurality of upstanding members 38 are placed in central hole 504 of data storage disc 500, the plurality of upstanding members 38 grip central hole 504;
   each of the plurality of upstanding members 38 having a height H such that when the plurality of upstanding members 38 engage central hole 504 of data storage disc 500, the plurality of upstanding members 38 protrude from opposite side 508 of data storage disc 500;
   a recessed area 37 centrally disposed on outside surface 26;
(c) installing first protective cover 20 on data storage side 506 of first data storage disc 500, wherein the plurality of upstanding members 38 grip said central hole and protrude therethrough;
(d) installing second protective cover 20 on data storage side 506 of second data storage disc 500, wherein the plurality of upstanding members 38 grip central hole 504 and protrude therethrough; and,
(e) placing opposite side 508 of first data storage disc 500 in contact with outside surface 26 of second protective cover 20, so that recessed area 37 of second protective cover 20 receives the protruding upstanding members 38 of first protective cover 20, so that opposite side 508 of first data storage disc 500 lies flatly on outside surface 26 of second protective cover 20.

Another method for protecting a data storage disc 500, includes:
(a) providing a data storage disc 500, including:
   an edge 502 having a first radius R1
   a central hole 504 having a second radius R2,
   a data storage side 506;
   an opposite side 508 from data storage side 506;
   a circular groove 512 disposed on opposite side 508 between first radius R1 and second radius R2;
(b) providing first and second protective covers 20, each protective cover 20 including:
   a disc 22 having an inside surface 24 and an opposite outside surface 26;
   a retainer 28 centrally connected to inside surface 24, retainer 28 shaped and dimensioned to be snuggly received by central hole 504 in data storage disc 500;
   a raised ring 46 disposed on outside surface 26, raised ring 46 shaped and dimensioned to be received by circular groove 512 on opposite side 508 of data storage disc 500;
(c) installing first protective cover 20 on data storage side 506 of data storage disc 500, wherein retainer 28 engages central hole 504 in data storage disc 500; and,
(d) placing raised ring 46 of second protective cover 20 in contact with opposite side 508 of data storage disc 500 so that circular groove 512 receives raised ring 46.

A method for stacking protective covers 20 for data storage discs 500 having a central hole 504, includes:
(a) providing first and second said protective covers 20, each protective cover 20 including:
   a disc 22 having an inside surface 24 and an opposite outside surface 26;
   a retainer 28 centrally connected to inside surface 24, retainer 28 shaped and dimensioned to be snuggly received by central hole 504 in data storage disc 500;
   retainer 28 including a plurality of upstanding members 38, the plurality of upstanding members 38 being spaced n° apart;

a corresponding plurality of cavities 40 disposed in outside surface 26, cavities 40 being spaced n° apart;

plurality of cavities 40 rotated with respect to the plurality of upstanding members 38;

wherein cavities 40 of first protective cover 20 may receive the upstanding members 38 of second protective cover 20, thereby enabling the two covers 20 to lie flatly against one another; and, (b) placing inside surface 24 of first protective cover 20 in contact with outside surface 26 of second protective cover 20, so that upstanding members 38 of first protective cover 20 are received by the cavities 40 of second protective cover 20, and the two protective covers 20 lie flatly against one another.

The, method further including:

(c) providing a post 600;

in step (a), each protective cover 20 further including a hole 32 centrally disposed in disc 22;

(d) stacking the first and second protective covers 20 on post 600 wherein post 600 is received by holes 32, and the upstanding members 38 of first protective cover 20 are received by the cavities 40 of second protective cover 20, thereby allowing the two protective covers 20 to lie flatly against one another.

Another method for protecting a data storage disc 500, includes:

(a) providing a data storage disc 500, data storage disc 500 including:
a central hole 504 having a second radius R2,
a data storage side 506;
an opposite side 508 from data storage side 506;

(b) providing first and second protective covers 20, each protective cover 20 including:
a disc 22 having an inside surface 24 and an opposite outside surface 26;
a retainer 28 centrally connected to inside surface 24, retainer 28 shaped and dimensioned to be snuggly received by central hole 504 in data storage disc 500;
retainer 28 including a plurality of upstanding members 38, the plurality of upstanding members 38 being spaced n° apart;
the plurality of upstanding members 38 defining a radius RM which is slightly greater than second radius R2 of central hole 504 in data storage disc 500, so that when the plurality of upstanding members 38 are placed in central hole 504 of data storage disc 500, the plurality of upstanding members 38 grip central hole 504;

(c) installing first protective cover 20 on data storage side 506 of data storage disc 500, wherein retainer 28 engages central hole 504 in data storage disc 500; and, (d) installing second protective cover 20 on opposite side 508 of data storage device 500, wherein in order to effect the installation, second protective cover 20 is rotated with respect to first protective cover 20, so that upstanding members 38 of first protective cover 20 will not interfere with upstanding members 38 of second protective cover 20.

The method further including:

in step (b), each of the plurality of upstanding members 38 having an end having a notch 48 and tab 50;

(e) rotating second protective cover 20 with respect to first protective cover 20, so that tab 50 of second protective cover 20 enters notch 48 of first protective cover 20, and tab 50 of first protective cover 20 enters notch 48 of second protective cover 20, thereby locking the first and second protective covers 20 together.

Figure 26:
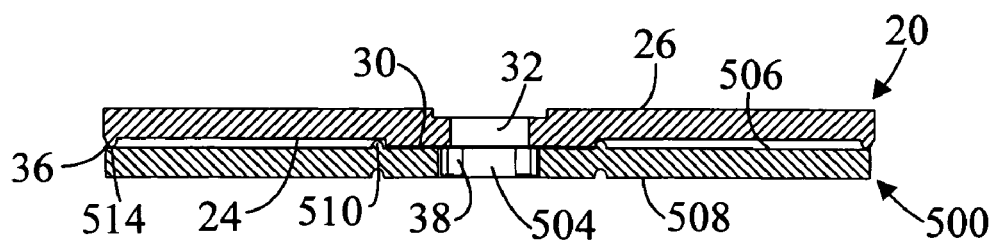

FIG. 26 is an enlarged perspective view of another alternative upstanding member design. In this embodiment, each of the plurality of upstanding members 38 has a height such that when the plurality of upstanding members 38 engage the central hole 504 of the data storage disc 500, the plurality of upstanding members 38 do not protrude from the opposite side 508 of the data storage disc 500. In this embodiment, protective cover 20/data storage disc 500 pairs may be flatly stacked.

The preferred embodiments of the invention described herein are exemplary and numerous modifications, variations, and rearrangements can be readily envisioned to achieve an equivalent result, all of which are intended to be embraced within the scope of the appended claims.

I claim:

1. A protective cover for a data storage disc, the data storage disc having (1) an edge having a first radius, (2) a central hole having a second radius, (3) a data storage side, and (4) an opposite side from the data storage side, said protective cover comprising:

a disc having an inside surface which contacts the data storage disc, and an opposite outside surface;

a retainer centrally connected to said inside surface, said retainer shaped and dimensioned to be snuggly received by the central hole in the data storage disc;

said retainer including a plurality of upstanding members, said plurality of upstanding members being spaced n° apart;

said plurality of upstanding members defining a radius which is slightly greater than the second radius of the central hole in the data storage disc, so that when said plurality of upstanding members are placed in the central hole of the data storage disc, said plurality of upstanding members grip the central hole;

each of said plurality of upstanding members having a height such that when said plurality of upstanding members engage the central hole of the data storage disc, said plurlaity of upstanding members protrude from the opposite side of the data storage disc;

a recessed area centrally disposed on said outside surface;

so that when a first said protective cover is installed on a data storage disc, and the opposite side of the data storage disc is placed in contact with said outside surface of a second protective cover, said recessed area of said second protective cover receives said plurality of protruding upstanding members of said first protective cover, so that said data storage disc lies flatly on said second protective cover.

2. The protective cover according to claim 1, further including:

said plurality of upstanding members being three.

3. A protective cover according to claim 1, further including:

said disc having an outer radius which is slightly larger than the first radius of the edge of the data storage disc, so that said protective cover will protect the edge of the data storage device.

4. A protective cover according to claim 1, further including:

a hole centrally disposed in said disc, so that a plurality of said protective covers may be stacked upon a post.

5. A protective cover according to claim 1, the data storage disc having an outer non-recording band, said protective cover further including:

an outer ring disposed on said inside surface; and, said outer ring having a radius so that when said protective cover contacts the data storage side of the data storage disc, said outer ring contacts the outer non-recording band.

6. A method for protecting a data storage disc, comprising:
(a) providing first and second data storage discs, each said data storage disc including:
an edge having a first radius,
a central hole having a second radius;
a data storage side;
an opposite side from said data storage side;
(b) providing first and second protective covers, each said protective cover including:
a disc having an inside surface and an opposite outside surface;
a retainer centrally connected to said inside surface, said retainer shaped and dimensioned to be snuggly received by said central hole in said data storage disc;
said retainer including a plurality of upstanding members, said plurality of upstanding members being spaced n° apart;
said plurality of upstanding members defining a radius which is slightly greater than said second radius of said central hole in said data storage disc, so that when said plurality of upstanding members are placed in said central hole of said data storage disc, said plurality of upstanding members grip said central hole;
each of said plurality of upstanding members having a height such that when said plurality of upstanding members engage said central hole of said data storage disc, said plurality of upstanding members protrude from said opposite side of said data storage disc;
a recessed area centrally disposed on said outside surface;
(c) installing said first protective cover on said data storage side of said first data storage disc, wherein said plurality of upstanding members grip said central hole and protrude therethrough;
(d) installing said second protective cover on said data storage side of said second data storage disc, wherein said plurality of upstanding member grip said central hole and protrude therethrough; and,
(e) placing said opposite side of said first data storage disc in contact with said outside surface of said second protective cover, so that said recessed area of said second protective cover receives said protruding upstanding members of said first protective cover, so that said opposite side of said first data storage disc lies flatly on said outside surface of said second protective cover.

* * * * *